(12) United States Patent
Makino et al.

(10) Patent No.: US 12,183,057 B2
(45) Date of Patent: Dec. 31, 2024

(54) INDIVIDUAL IDENTIFICATION APPARATUS

(71) Applicant: NEC Corporation, Tokyo (JP)

(72) Inventors: Kengo Makino, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 17/639,433

(22) PCT Filed: Oct. 23, 2020

(86) PCT No.: PCT/JP2020/039926
§ 371 (c)(1),
(2) Date: Mar. 1, 2022

(87) PCT Pub. No.: WO2022/085185
PCT Pub. Date: Apr. 28, 2022

(65) Prior Publication Data
US 2023/0351723 A1 Nov. 2, 2023

(51) Int. Cl.
G06V 10/75 (2022.01)

(52) U.S. Cl.
CPC ........ G06V 10/751 (2022.01); G06V 2201/06 (2022.01)

(58) Field of Classification Search
CPC .. G06V 10/751; G06V 2201/06; G06T 7/001; G06T 7/0004; G06T 2207/30108; H04N 23/695; H04N 23/66
See application file for complete search history.

(56) References Cited

U.S. PATENT DOCUMENTS

2008/0247630 A1* 10/2008 Horiuchi ................ G09G 3/006
382/141
2013/0307976 A1* 11/2013 Kiura .................... G06V 10/141
348/143
(Continued)

FOREIGN PATENT DOCUMENTS

JP 2012165135 A * 8/2012 ........... G06K 9/2027
JP 2017045166 A * 3/2017 ........... G06K 9/2027
(Continued)

OTHER PUBLICATIONS

International Search Report for PCT Application No. PCT/JP2020/039926, mailed on Jan. 12, 2021.
(Continued)

Primary Examiner — Michael Robert Cammarata

(57) ABSTRACT

An individual identification apparatus includes a setting means for setting an imaging condition for imaging a matching area of an object by a camera, an acquisition means for acquiring a matching image that is an image obtained by imaging the matching area of the object by the camera, a matching means for performing matching between the matching image and a registration image registered in advance, and a control means. The control means repeats processing of acquiring the matching image by the acquisition means and matching between the matching image and the registration image by the matching means, while changing the imaging condition set by the setting means, and determines an imaging condition in which a matching degree between the matching image and the registration image becomes a preset threshold or larger. The matching means identifies an individual based on the matching image captured under the determined imaging condition.

7 Claims, 14 Drawing Sheets

(56) References Cited

U.S. PATENT DOCUMENTS

| | | | |
|---|---|---|---|
| 2017/0287147 A1* | 10/2017 | Takahashi | G06T 7/35 |
| 2018/0039830 A1* | 2/2018 | Ishiyama | G06T 7/00 |
| 2018/0286033 A1* | 10/2018 | Ishiyama | G06T 7/0006 |
| 2019/0287266 A1* | 9/2019 | Takahashi | G06K 19/06028 |
| 2019/0325606 A1* | 10/2019 | Oota | G06T 7/001 |
| 2020/0342259 A1* | 10/2020 | Jordan | G06F 18/285 |
| 2021/0281748 A1 | 9/2021 | Nogami et al. | |
| 2022/0335617 A1* | 10/2022 | Takahashi | G06T 7/001 |
| 2022/0414851 A1* | 12/2022 | Makino | G06F 16/5854 |
| 2023/0049798 A1* | 2/2023 | Mizui | G06T 7/00 |

FOREIGN PATENT DOCUMENTS

| | | | | |
|---|---|---|---|---|
| JP | 6206645 B | 10/2017 | | |
| JP | 2019-158602 A | 9/2019 | | |
| JP | 2020-096325 A | 6/2020 | | |
| WO | 93/001559 A1 | 1/1993 | | |
| WO | WO-2020039567 A1 * | 2/2020 | | A61J 3/007 |
| WO | 2020/110576 A1 | 6/2020 | | |
| WO | WO-2020110269 A1 * | 6/2020 | | G06T 7/001 |
| WO | WO-2021220829 A1 * | 11/2021 | | G06V 10/42 |

OTHER PUBLICATIONS

Japanese Office Action for JP Application No. 2022-556354, mailed on Dec. 12, 2023 with English Translation.
Extended European Search Report for EP Application No. 20951837.2, dated on Aug. 26, 2022.

* cited by examiner

FIG. 6

| POSITION DEVIATION BETWEEN REGISTRATION IMAGE AND MATCHING IMAGE | AVERAGE MATCHING SCORE OF IDENTICAL INDIVIDUAL |
|---|---|
| 0% | 0.836 |
| 10% | 0.621 |
| 20% | 0.366 |
| 30% | 0.182 |
| 40% | 0.073 |
| 50% | 0.033 |

FIG. 8

| PRODUCT ID | FIRST PROCESS | | SECOND PROCESS | |
|---|---|---|---|---|
| | MANUFACTURING INFORMATION | REGISTRATION IMAGE | MANUFACTURING INFORMATION | REGISTRATION IMAGE |
| 001 | M101 | G101 | M201 | G201 |
| 002 | M102 | G102 | | |
| 003 | M103 | G103 | | |
| 004 | M104 | G104 | | |
| 005 | M105 | G105 | | |
| 006 | M106 | G106 | | |
| 007 | M107 | G107 | | |
| 008 | M108 | G108 | | |

INDIVIDUAL IDENTIFICATION APPARATUS

This application is a National Stage Entry of PCT/JP2020/039926 filed on Oct. 23, 2020, the contents of all of which are incorporated herein by reference, in their entirety.

TECHNICAL FIELD

The present invention relates to an individual identification apparatus, an individual identification method, and a storage medium.

BACKGROUND ART

An attempt to extract random patterns unique to an object from an image in which the object is captured and utilize the individual difference of the random patterns for authentication and matching has been performed.

For example, Patent Literature 1 discloses art as described below (hereinafter, referred to as related art). In first related art, in the case of imaging a matching area of a matching object, among reference images of respective mobile terminals for controlling the position and posture of the cameras of the mobile terminals so as to be able to image a matching area of the matching object under the same imaging condition in different types of mobile terminals, a reference image corresponding to the own terminal is acquired. Then, in the related art, the reference image is displayed in a superimposition manner on a through image shown on the display unit. Thereby, a capturing person is assisted to image the matching area of the matching object under the same imaging condition in different types of mobile terminals. The matching image of the matching area of the matching object, captured in this way, is applied with matching with a registration image of the matching area of the registered object that is imaged and stored in advance, and individual identification is performed.

Patent Literature 1: JP 6206645 B

SUMMARY

According to the related art described above, it is possible to obtain a matching image in which a matching area of a matching object is captured under a predetermined imaging condition. However, in the related art described above, it is difficult to allow the imaging condition of a matching image to positively coincide with the imaging condition of the registration image. This is because in the case where there is no logo or the like serving as a guide for the matching area, it is difficult to set the reference image to the matching area. In addition, even if a matching image is captured under a predetermined imaging condition, it is not always the case that the registration image is captured under the same imaging condition as that of the matching image.

An object of the present invention is to provide an individual identification apparatus capable of solving the above-described problem, that is, a problem that it is difficult to allow the imaging condition of a matching image to positively coincide with the imaging condition of a registration image.

An individual identification apparatus, according to one aspect of the present invention, is configured to include
a setting means for setting an imaging condition for imaging a matching area of an object by a camera,
an acquisition means for acquiring a matching image that is an image obtained by imaging the matching area of the object by the camera,
a matching means for performing matching between the matching image and a registration image registered in advance, and
a control means for repeating processing of acquiring the matching image by the acquisition means and processing of performing matching between the matching image and the registration image by the matching means while changing the imaging condition set by the setting means, and determining an imaging condition in which a matching degree between the matching image and the registration image becomes equal to or larger than a preset threshold. The matching means is configured to identify an individual on the basis of the matching image captured under the determined imaging condition.

An individual identification method comprising, according to one aspect of the present invention, is configured to include
repeating capturing of a matching image that is an image of a matching area of an object and matching between the matching image and a registration image that is an image of a matching area of an object registered in advance, while changing an imaging condition for imaging the matching area of the object by a camera,
determining an imaging condition in which a matching degree between the matching image and the registration image becomes equal to or larger than a preset threshold, and
identifying an individual on the basis of the matching image captured under the determined imaging condition.

A program, according one aspect of the present invention, is configured to cause a computer to perform processing of
repeating capturing of a matching image that is an image of a matching area of an object and matching between the matching image and a registration image that is an image of a matching area of an object registered in advance, while changing an imaging condition for imaging the matching area of the object by a camera,
determining an imaging condition in which a matching degree between the matching image and the registration image becomes equal to or larger than a preset threshold, and
identifying an individual on the basis of the matching image captured under the determined imaging condition.

With the configurations described above, the present invention enables the imaging condition of a matching image to positively coincide with the imaging condition of a registration image.

BRIEF DESCRIPTION OF DRAWINGS

FIG. 6 illustrates an example of a relationship between position deviation between a registration image and a matching image, and an average matching score of identical individuals.

FIG. 8 is a diagram illustrating an exemplary configuration of a product DB in the individual identification apparatus according to the first exemplary embodiment of the present invention.

EXEMPLARY EMBODIMENTS

First Exemplary Embodiment

Figure 1:
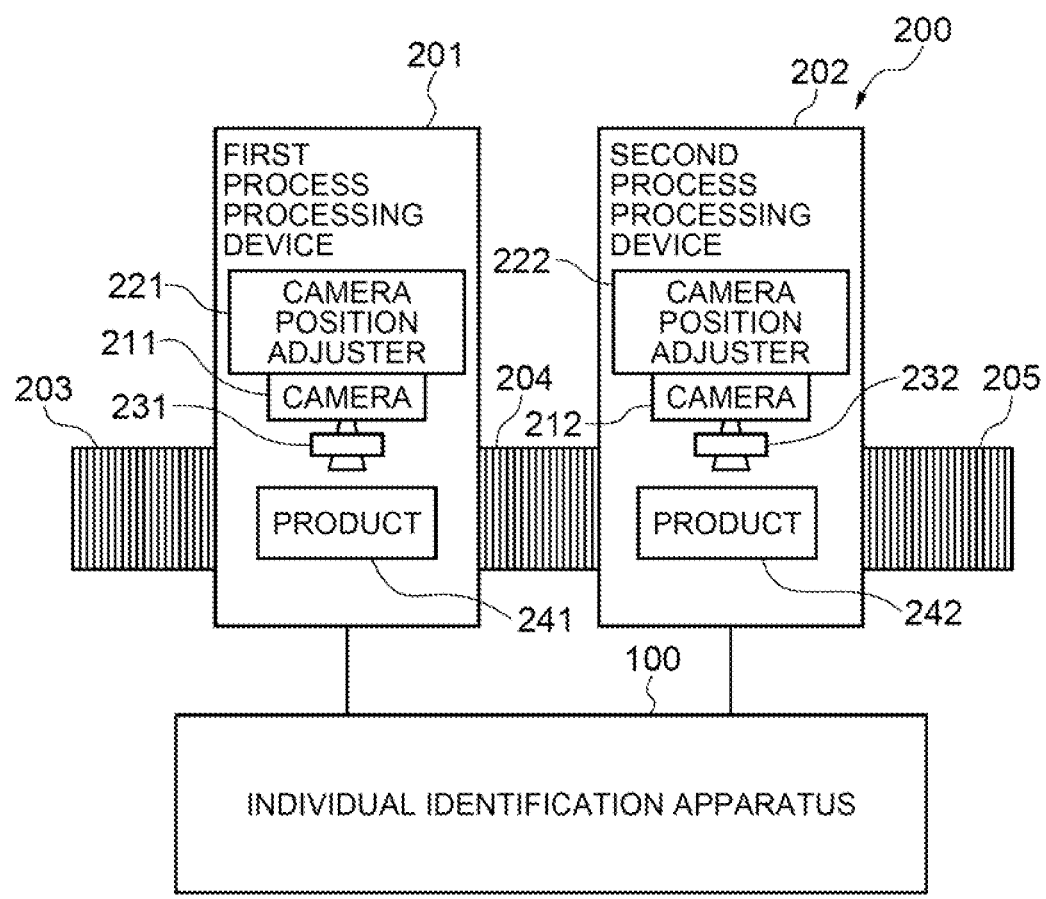
FIG. 1 is a block diagram of an individual identification system according to a first exemplary embodiment of the present invention.

FIG. 1 is a block diagram of an individual identification system 10 according to a first exemplary embodiment of the present invention. The individual identification system 10 includes an individual identification apparatus 100 and a production line 200.

The production line 200 is a line for producing industrial products. The industrial products to be produced are not limited particularly. For example, industrial products may be electric products such as printed wiring boards, food products such as canned beer, and pharmaceutical products such as medicines. The production line 200 is configured to include at least two process processing devices, namely a first process processing device 201 and a second process processing device 202, and conveying machines 203 to 205 such as conveyers. For example, in the case of a surface mount technology (SMT) line of printed wiring boards, the first process processing device 201 is a solder printer that applies solder onto substrates for example, and the second process processing device 202 is a component mounter that mounts a plurality of electronic components on predetermined locations of substrates after the solder printing. Alternatively, the first process processing device 201 may be a component mounter, and the second process processing device 202 may be a reflow device that allows a substrate to flow in a thermostatic bath to melt and fix solder in order to fix the mounted components on the substrate. The conveying machines 203 to 205 are means for conveying products from the upstream side to the downstream side one by one, in the order of the first process processing device 201 and the second process processing device 202.

The production line 200 includes at least two phases namely an adjustment phase and an operation phase. The adjustment phase is performed prior to the operation phase. In the adjustment phase, processing such as adjustment of a camera position, to be described below, is performed. In the operation phase, processing to produce a large amount of products in an assembly-line system is performed. In the operation phase, the products having passed through the first process processing device 201 are then carried into the second process processing device 202. However, between the first process processing device 201 and the second process processing device 202, a buffer in which products are temporarily accumulated in random order may be provided. Therefore, the products having passed through the first process processing device 201 do not always pass through the second process processing device 202 while keeping the passing order. Therefore, individual identification is performed to identify that a product carried into the second process processing device 202 is identical to which product having passed through the first process processing device 201.

The individual identification apparatus 100 is an information processing device that manages individual products produced in the production line 200 in order to perform manufacturing process management, quality management, shipping management, sales management, and the like. The individual identification apparatus 100 and the first process processing device 201 and the second process processing device 202 are connected communicably with each other in a wired or wireless manner. The first process processing device 201 and the second process processing device 202 are provided with cameras 211 and 212 for imaging predetermined parts of products 241 and 242 carried into the first process processing device 201 and the second process processing device 202 for individual identification, camera position adjusters 221 and 222 for adjusting positions of the cameras 211 and 212, and lightings 231 and 232 for irradiating products with light for imaging. Each of the cameras 211 and 212 may be a visible-light color camera equipped with a charge-coupled device (CCD) image sensor or a complementary MOS (CMOS) image sensor having a pixel capacity of about several millions pixels, for example. Each of the camera position adjusters 221 and 222 may be a ball screw actuator or a robot arm, for example. Each of the lightings 231 and 232 may be a ring lighting, for example.

Figure 2:
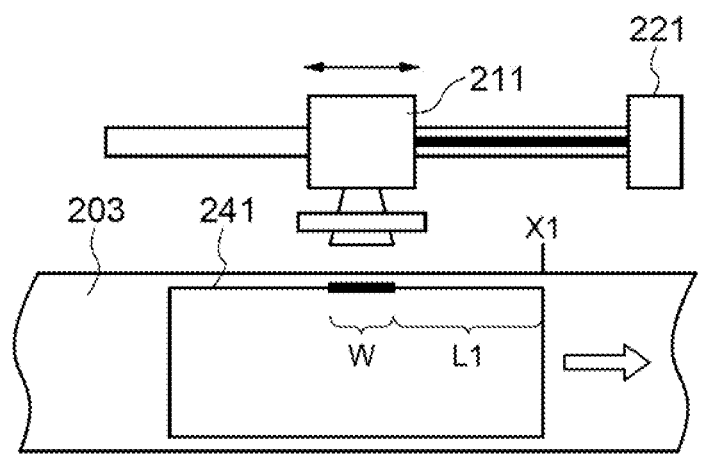
FIG. 2 is a plan view illustrating an example of a relative positional relation between a product and a camera at the time of imaging the product in a first process processing device of a production line constituting the individual identification system according to the first exemplary embodiment of the present invention.
Figure 3:
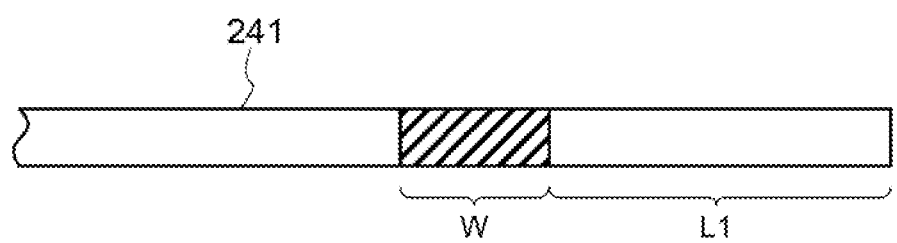
FIG. 3 is an illustration of a matching area of a registration image captured in the first process processing device of the production line constituting the individual identification system according to the first exemplary embodiment of the present invention.

FIG. 2 is a plan view illustrating an example of a relative positional relation between the camera 211 and the product 241 at the time of imaging the product in the first process processing device 201. The camera 211 is placed at a position where a side surface of the product 241 can be imaged from the right in front. The position of the camera 211 is adjustable in the left direction on the sheet (upstream direction in the production line) and the right direction on the sheet (downstream direction in the production line) by the camera position adjuster 221. When the product 241 is carried into the first process processing device 201 by the conveying machine 203, at the point of time when the tip of the product 241 reaches a predetermined position X1, conveyance is temporarily stopped and the product 241 is in a stationary state. The camera 211 images a side surface of the product 241 in a stationary state from the right in front. At that time, as illustrated in FIG. 3, the camera 211 acquires a registration image that is an image in which a product side surface portion having a horizontal width W, away from the tip of the product 241 by a distance L1, is captured as a matching area. Then, after being adjusted to a camera position from which an image of such a product side surface portion can be captured, the camera 211 is fixed at the position.

Figure 4:
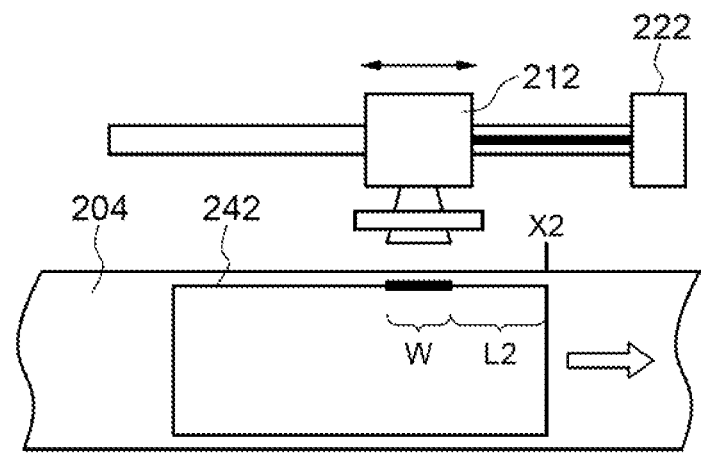
FIG. 4 is a plan view illustrating an example of a relative positional relation between a product and a camera at the time of imaging a product in a second process processing device of the production line constituting the individual identification system according to the first exemplary embodiment of the present invention.
Figure 5:
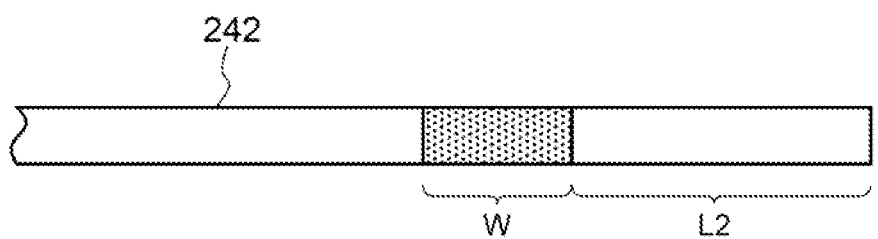
FIG. 5 is an illustration of a matching area of a matching image captured in the second process processing device of the production line constituting the individual identification system according to the first exemplary embodiment of the present invention.

Meanwhile, FIG. 4 is a plan view illustrating an example of a relative positional relation between the camera 212 and the product 242 at the time of imaging the product in the second process processing device 202. The camera 212 is placed at a position where a side surface of the product 242 can be imaged from the right in front. The position of the camera 212 is adjustable in the left and right directions on the sheet (upstream and down stream directions in the production line) by the camera position adjuster 222. When the product 242 is carried into the second process processing device 202 by the conveying machine 204, at the point of time when the tip of the product 242 reaches a predetermined position X2, conveyance is temporarily stopped and the product 242 is in a stationary state. The camera 212 images a side surface of the product 242 in a stationary state from the right in front. At that time, the camera 212 is adjusted to a camera position from which an image of a product side surface portion that is the same as that of the registration image, that is, a product side surface portion having the horizontal width W, away from the tip of the product 242 by the distance L2, can be captured as a matching image However, due to various factors such as lack of manual adjustment of a camera position or an individual difference in the camera position adjuster, a position deviation in the matching area may be caused between the matching image captured by the camera 212 in the second process processing device 202 and the registration image captured by the camera 211 in the first process processing device 201. For example, in order to adjust the position of the camera 212 of the second process processing device 202 to the same position as the camera 211 of the first process processing device 201, even when the camera position adjuster 222 is provided with a movement amount that is the same as the movement amount given to the camera position adjuster 221, the camera may not be adjusted to the same position actually due to the individual difference between the camera position adjusters 221 and 222. Then, when the camera 212 is placed at a position from which an image of a product side surface portion having a lateral width W away from a distance L2 (≠L1) from the tip of the product 242 as a matching image as illustrated in FIG. 5, a phenomenon that the matching image does not match the registration image although they are images of the same product actually occurs.

FIG. 6 illustrates an example of a relationship between position deviation between a registration image and a matching image, and an average matching score of the identical individual, created based on experimental results carried out by the present inventor. The number of individuals used in the experiments is 1000, and the value range of matching scores is from 0 to 1 (1 is the highest score). Referring to FIG. 6, when there is no position deviation (position deviation 0%), the average matching score of identical individuals is 0.836. On the other hand, when position deviation occurs, the average matching score of identical individual decreases as the deviation amount increases. Therefore, when position deviation occurs between a matching image captured by the camera 212 in the second process processing device 202 and a registration image captured by the camera 211 in the first process processing device 201, it is very important to detect it and solve the position deviation. Therefore, by focusing on the fact that the matching score with the matching image captured by the second process processing device 202 for a product that is the same as the registration image of the product captured by the first process processing device 201 is better as the position deviation between the registration image and the matching image is smaller, the individual identification apparatus 100 adjusts the position of the camera 212 of the second process processing device 202 so as to maximize the matching score or allow the score to be a preset threshold or larger. Hereinafter, the individual identification apparatus 100 will be described in detail.

Figure 7:
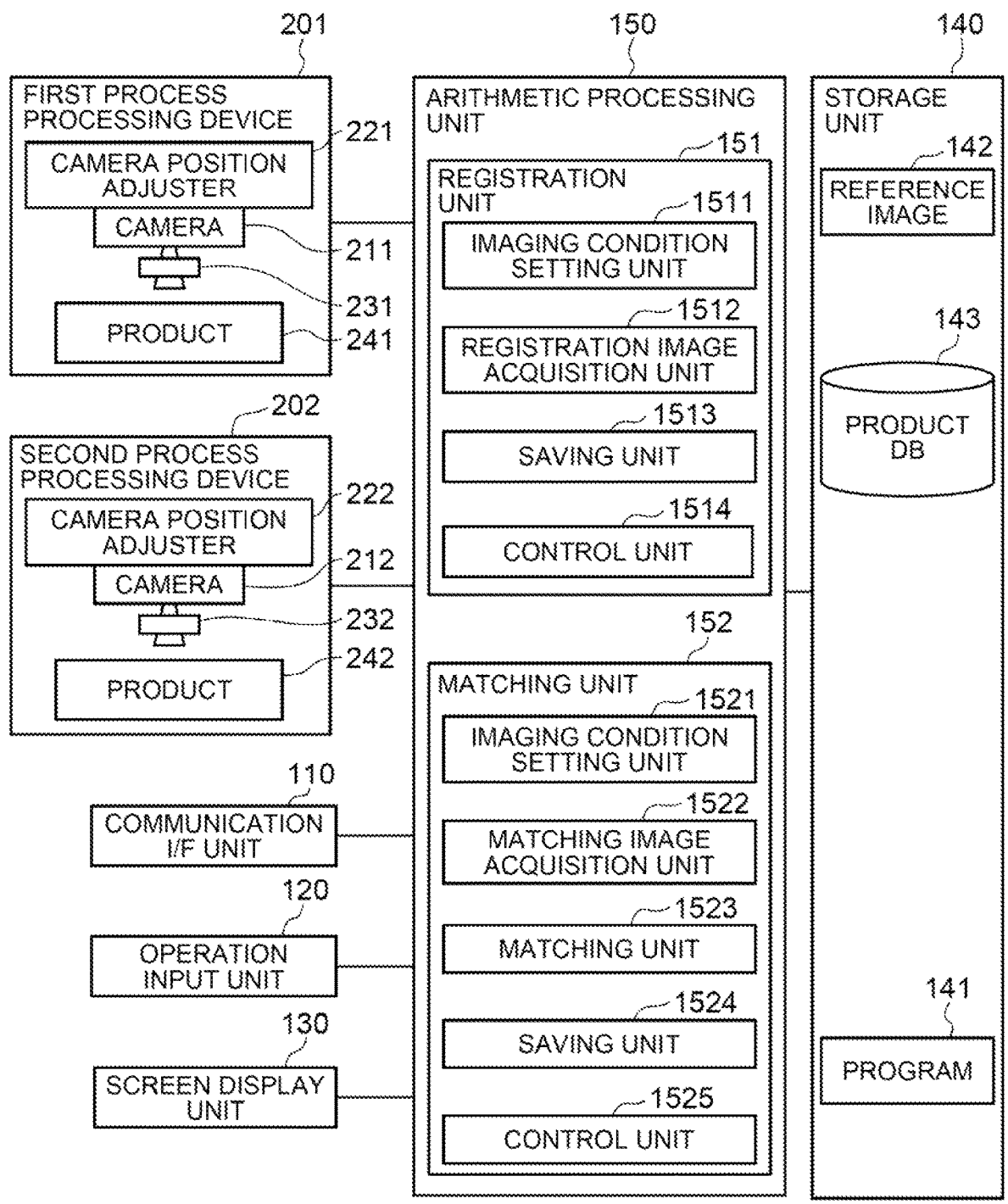
FIG. 7 is a block diagram of an individual identification apparatus according to the first exemplary embodiment of the present invention.

FIG. 7 is a block diagram of the individual identification apparatus 100. Referring to FIG. 7, the individual identification apparatus 100 is communicably connected with the first process processing device 201 and the second process processing device 202. The individual identification apparatus 100 is also configured to include a communication interface (I/F) unit 110, an operation input unit 120, a screen display unit 130, a storage unit 140, and an arithmetic processing unit 150.

The communication I/F unit 110 is configured of a data communication circuit, and is configured to perform data communication with an external device in a wireless or wired manner. The operation input unit 120 is configured of devices such as a keyboard and a mouse, and is configured to detect operation by an operator and output it to the arithmetic processing unit 150. The screen display unit 130 is configured of a device such as a liquid crystal display (LCD), and is configured to display, on a screen, various types of information according to an instruction from the arithmetic processing unit 150.

The storage unit 140 is configured of storage devices such as a hard disk and a memory, and is configured to store therein processing information and a program 141 necessary for various types of processing in the arithmetic processing unit 150. The program 141 is a program for implementing various processing units by being read and executed by the arithmetic processing unit 150, and is read in advance from an external device or a storage medium via a data input-output function of the communication I/F unit 110 and is stored in the storage unit 140. Main processing information stored in the storage unit 140 includes a reference image 142 and a product database (DB) 143.

The reference image 142 is an image of a product for position adjustment (hereinafter referred to as a reference product) carried into the first process processing device 201, captured by the camera 211 whose position has been adjusted. The image includes a product side surface portion having a lateral width W, away from the tip of the reference product by the distance L1, as a matching area. The reference product is one of a plurality of products produced in the production line 200. The reference product may be applied with predetermined processes in the first process processing device 201 and the second process processing device 202 as same as the other products produced in the production line 200, or those processes may be omitted.

The product DB 143 is a database for storing information such as images of products that are mass-produced in the production line 200. FIG. 8 illustrates an exemplary configuration of the product DB 143. The product DB 143 of this example is configured of a plurality of entries, and one entry is configured of fields for manufacturing ID, manufacturing information and a registration image of the first process, and manufacturing information and a matching image of the second process. In the product ID field, an ID such as a serial number assigned to each product is set. In the fields of manufacturing information and a registration image of the first process, manufacturing information including the work history of the product in the first process, the form of components used, rot number, and the like, and a registration image that is an image of the product captured by the camera 211, are set. In the fields of manufacturing information and a matching image of the second process, manufacturing information including the work history of the product in the second process, the form of components used, rot number, and the like, and a matching image that is an image of the product captured by the camera 212, are set.

The arithmetic processing unit 150 has a processor such as an MPU and the peripheral circuits, and is configured to read and execute the program 141 from the storage unit 140 to allow the hardware and the program 141 to cooperate with each other to thereby implement the various processing units. The main processing units to be implemented by the arithmetic processing unit 150 is a registration unit 151 and a matching unit 152.

The registration unit 151 is configured to acquire an image of a reference product carried into the first process processing device 201 in the adjustment phase of the production line 200, and stores it in the storage unit 140 as the reference image 142. The registration unit 151 is also configured to acquire an image or the like of a product carried into the first process processing device 201 in the operation phase of the production line 200, and stores it in the product DB 143. The registration unit 151 includes an imaging condition setting unit 1511, a registration image acquisition unit 1512, a saving unit 1513, and a control unit 1514.

The imaging condition setting unit 1511 adjusts the position of the camera 211 in the first process processing device 201 by the camera position adjuster 221 in the adjustment phase, in accordance with an instruction input by the operator via the operation input unit 120 for example.

The registration image acquisition unit 1512 acquires a registration image obtained by capturing a matching area of the reference product carried into the first process processing device 201 by the camera 211, in the adjustment phase. Further, in the operation phase, each time a product is carried into the first process processing device 201, the registration image acquisition unit 1512 acquires a registration image obtained by capturing a matching area of the product by the camera 211.

The saving unit 1513 records the registration image of the reference product acquired by the registration image acquisition unit 1512 on the storage unit 140 as the reference image 142, in the adjustment phase. Further, in the operation phase, the saving unit 1513 records the registration image of the product acquired by the registration image acquisition unit 1512 and the manufacturing information regarding the product acquired from the first process processing device 201 on the product DB 143.

The control unit 1514 controls the respective units such that processing corresponding to the adjustment phase and the operation phase are performed by the imaging condition setting unit 1511, the registration image acquisition unit 1512, and the saving unit 1513, in accordance with instructions input from the operator via the operation input unit 120 for example.

The matching unit 152 adjusts the position of the camera 212 of the second process processing device 202 with use of the reference product, in the adjustment phase. Specifically, the matching unit 152 repeats capturing of a matching image that is an image of a matching area of the reference product and matching between the matching image and the reference image 142 stored in the storage unit 140, while changing the camera position for capturing the matching area of the reference product carried into the second process processing device 202 by the camera 212, and determines the camera position in which the matching degree between the matching image and the reference image becomes a preset threshold or larger. Further, in the operation phase, each time a product is carried into the second process processing device 202, the matching unit 152 acquires an image of the matching area of the product from the camera 212 as a matching image, and performs matching with the registration image of a product having passed through the first process processing device 201 recorded on the product DB 143 of the storage unit 140, to thereby perform individual identification for identifying which of the products having passed through the first process processing device 201 the product carried into the second process processing device 202 is. Further, the matching unit 152 adjusts the position of the camera 212 on the basis of the result of individual identification in the operation phase, as required. The matching unit 152 includes an imaging condition setting unit 1521, a matching image acquisition unit 1522, a matching unit 1523, a saving unit 1524, and a control unit 1525.

The imaging condition setting unit 1521 adjusts the position of the camera 212 in the second process processing device 202 by the camera position adjuster 222, in accordance with an instruction from the control unit 1525 in the adjustment phase and the operation phase.

The matching image acquisition unit 1522 acquires a matching image obtained by capturing a matching area of the reference product carried into the second process processing device 202 by the camera 212, in the adjustment phase. Further, in the operation phase, each time a product is carried into the second process processing device 202, the matching image acquisition unit 1522 acquires a matching image obtained by capturing the matching area of the product by the camera 212.

The matching unit 1523 performs matching between the matching image of the reference product acquired by the matching image acquisition unit 1522 with the reference image 142 stored in the storage unit 140, and calculates a matching score that is an index indicating the matching degree between them, in the adjustment phase. Further, in the operation phase, the matching unit 1523 performs matching between the matching image of the product carried into the second process processing device 202 acquired by the matching image acquisition unit 1522 with the registration image of the product having passed through the first process processing device 201 stored in the product DB 143 of the storage unit 140, and calculates the matching score that is an index indicating the matching degree between them. Further, in the operation phase, the matching unit 1523 determines to which of the products having passed through the first process processing device 201 the product carried into the second process processing device 202 is identical, on the basis of the calculated matching score.

Here, any specific methods can be used for performing matching on two images. For example, two images themselves may be compared with each other, or feature amounts obtained by applying any transformation to the two images may be compared with each other. For example, frequency spectrum images obtained by applying frequency transform such as Fourier transform to two images respectively may be compared with each other. Alternatively, two images may be first applied with frequency transform such as Fourier transform to be transformed into frequency spectrum images respectively, and then, the frequency spectrum images may be applied with polar conversion or log polar conversion, and polar coordinate images (Fourier Mellin feature images) obtained therefrom may be compared with each other. Alternatively, two images may be first applied with frequency transform such as Fourier transform to be transformed into frequency spectrum images respectively, and then, the frequency spectrum images may be applied with polar conversion or log polar conversion to be transformed in to Fourier Mellin features, and the Fourier Mellin features may be further applied with frequency transform such as Fourier transform and phase images obtained therefrom may be compared with each other.

The saving unit 1524 records the matching image of a product carried into the second process processing device 202 and manufacturing information of the product acquired from the second process processing device 202 on the product DB 143 of the storage unit 140 in association with the registration image of the product determined to be identical, on the basis of the determination result of the matching unit 1523, in the operation phase.

The control unit 1525 controls the respective units such that processing corresponding to the adjustment phase and the operation phase is performed by the imaging condition setting unit 1521, the matching image acquisition unit 1522, the matching unit 1523, and the saving unit 1524, in accordance with an instruction input from the operator via the operation input unit 120 for example.

Figure 9:
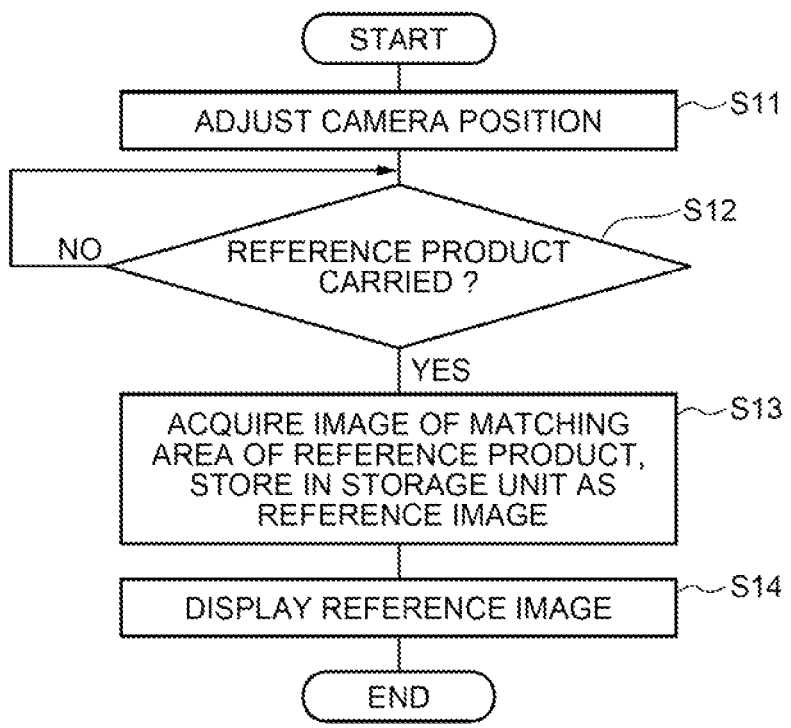
FIG. 9 is a flowchart illustrating an exemplary operation of a registration unit in an adjustment phase of the individual identification apparatus according to the first exemplary embodiment of the present invention.
Figure 10:
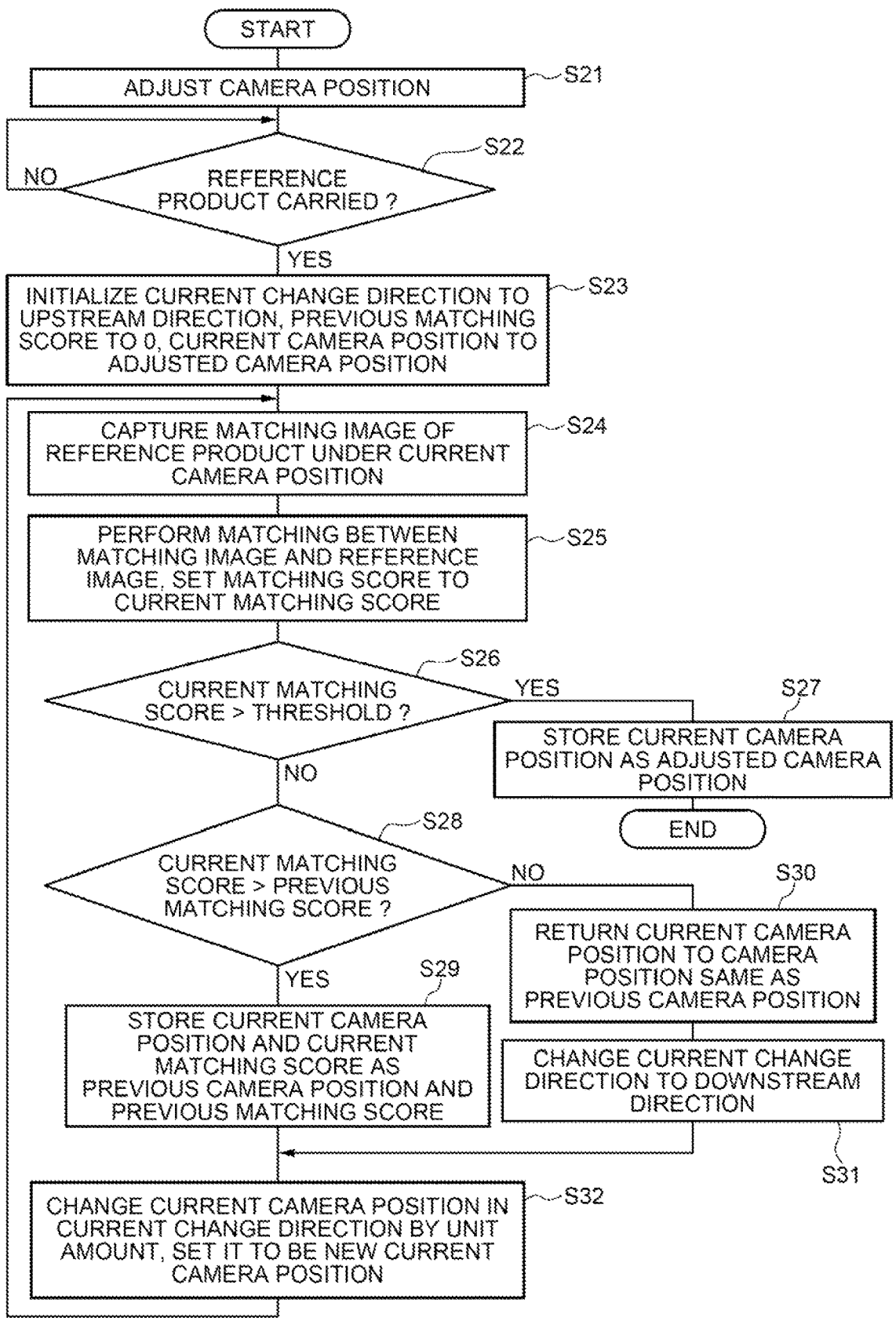
FIG. 10 is a flowchart illustrating an exemplary operation of a matching unit in the adjustment phase of the individual identification apparatus according to the first exemplary embodiment of the present invention.

Next, operation of the individual identification apparatus 100 will be described. First, operation in the adjustment phase of the individual identification apparatus 100 will be described. FIG. 9 is a flowchart illustrating an exemplary operation of the registration unit 151 in the adjustment phase of the individual identification apparatus 100. FIG. 10 is a flowchart illustrating an exemplary operation of the matching unit 152 in the adjustment phase of the individual identification apparatus 100.

First, operation of the registration unit 151 in the adjustment phase of the individual identification apparatus 100 will be described with reference to FIG. 9. When an instruction to initiate the adjustment phase is given by a command of the operator from the operation input unit 120 for example, the control unit 1514 of the registration unit 151 receives camera position information input from the operator, and adjusts the position of the camera 211 of the first process processing device 201 by the imaging condition setting unit 1511 to a position matching the matching area of the product manufactured by the production line 200 (step S11). Since the optimum matching area of a product differs depending on the type of the product, the operator adjusts it by inputting position information of the camera 211 corresponding to the type of the product to be manufactured from the operation input unit 120. Here, according to the camera position information input from the operator, it is assumed that the camera 211 is adjusted to a camera position where a product side surface portion having a lateral width W, away from the tip of the product 241 by the distance L1, can be captured as a matching area, as described with reference to FIGS. 3 and 4.

When the position adjustment of the camera 211 by the imaging condition setting unit 1511 is completed, the operator places the reference product on the conveying machine 203, and allows it to be carried toward the first process processing device 201. When the reference product is carried into the first process processing device 201, it is detected by a sensor, not illustrated, provided to the first process processing device 201, and at the point of time when the tip of the reference product reaches the predetermined position X1, conveyance is temporarily stopped and the reference product is in a stationary state. Further, the fact that the product has been carried into the first process processing device 201 is notified from the first process processing device 201 to the individual identification apparatus 100 via communication. When the control unit 1514 of the registration unit 151 detects that the reference product has been carried via the communication (YES at step S12), an image of the matching area of the reference product is acquired by the registration image acquisition unit 1512 as the reference image 142, and it is saved in the storage unit 140 by the saving unit 1513 (step S13). Then, the control unit 1514 reads out the reference image 142 from the storage unit 140 to display it on the screen display unit 130, and notifies the operator of the fact that acquisition of the reference image is completed (step S14).

In this way, by the operation of the registration unit 151 in the adjustment phase, the position of the camera 211 in the first process processing device 201 in the production line 200 is adjusted, and the reference image 142 that is an image of the matching area of the reference product captured under the adjusted camera position is saved in the storage unit 140.

Next, operation of the matching unit 152 in the adjustment phase will be described. When acquisition of the reference image 142 ends, the operator instructs initiation of the adjustment phase to the control unit 1525 of the matching unit 152 from the operation input unit 120 for example. Then, the operator first inputs information of the camera position that is identical to the camera position of the adjusted camera 211, from the operation input unit 120 for example. When initiation of the adjustment phase is instructed, the control unit 1525 of the matching unit 152 initiates the processing illustrated in FIG. 10, and according to the input information of the camera position, the position of the camera 212 of the second process processing device 202 is adjusted by the imaging condition setting unit 1521 (step S21). Thereby, the position of the camera 212 is adjusted to a position almost matching the matching area of the product to be processed by the second process processing device 202. However, due to an influence of an individual difference in the camera position adjusters, there is a possibility that position deviation may be caused between the matching area of the product imaged by the camera 212 of the second process processing device 202 and the matching area of the product imaged by the camera 211 of the first process processing device 201.

Then, the operator takes out the reference product having carried in the first process processing device 201 from the first process processing device 201, places it on the conveying machine 204, and allows it to be conveyed toward the second process processing device 202. When the reference product is carried into the second process processing device 202 by the conveying machine 204, it is detected by a sensor, not illustrated, provided to the second process processing device 202, and at the point of time when the tip of the reference product reaches the predetermined position X2, conveyance is temporarily stopped and the reference product is in a stationary state. Further, the fact that the product has been carried into the second process processing device 202 is notified from the second process processing device 202 to the individual identification apparatus 100 via communication. When the control unit 1525 of the matching unit 152 detects that the reference product has been carried (YES at step S22), the position of the camera 212 is adjusted in the following manner such that no position deviation occurs between the matching area of the product to be imaged by the camera 212 and the matching area of the product to be imaged by the camera 211.

First, the control unit 1525 initializes the current change direction to the upstream direction, the previous matching score to 0, and the current camera position to the camera position adjusted at step S21, respectively (step S23).

Then, the control unit 1525 acquires a matching image that is an image of a matching area of the reference product by the matching image acquisition unit 1522 under the current camera position (step S24). That is, the control unit 1525 allows the position of the camera 212 to coincide with the current camera position by the camera position adjuster 222, and acquires a matching image of the reference product by the matching image acquisition unit 1522. Then, the control unit 1525 performs matching between the matching image acquired at step S24 immediately before with the reference image 142 stored in the storage unit 140 by the matching unit 1523, calculates a matching score indicating the matching degree between them, and sets the calculated matching score to the current matching score (step S25). Then, the control unit 1525 determines whether or not the current matching score is larger than a preset threshold (step S26). The threshold is set in advance under the state where distribution of average matching scores of the identical individuals and distribution of average matching score of different individuals sufficiently separate from each other. Then, when the current matching score is larger than the threshold, the control unit 1525 stores the current camera position as the adjusted matching camera position (step S27), and ends the processing of FIG. 10.

On the other hand, when the current matching score is equal to or smaller than the threshold, the control unit 1525 determines whether or not the current matching score is larger than the previous matching score (step S28). Then, when the current matching score is larger than the previous matching score, the control unit 1525 stores the current camera position and the current matching score as the previous camera position and the previous matching score (step S29), and proceeds to step S32. Meanwhile, when the current matching score is not larger than the previous matching score, the control unit 1525 returns the current camera position to the camera position that is the same as the previous camera position (step S30), changes the current change direction to the downstream direction (step S31), and proceeds to step S32.

At step S32, the control unit 1525 sets the camera position changed in the current change direction by the unit amount from the current camera position to be a new current camera position. Then, the control unit 1525 returns to step S24 and repeats the same processing as that described above. Then, at the point of time when the current matching score becomes larger than the threshold, the control unit 1525 ends the repetition of the processing, and stores the current camera position at that point of time as the adjusted matching camera position (step S27). Then, the control unit 1525 ends the processing of FIG. 10.

As described above, by the operation of the matching unit 152 in the adjustment phase, capturing of a matching image that is an image of a matching area of the reference product and matching between the matching image and the reference image are repeated, while changing the camera position for capturing the matching area of the reference product by the camera 212, whereby the camera position of the camera 212 in which the matching score between the matching image and the reference image becomes a preset threshold or larger is determined.

Figure 11:
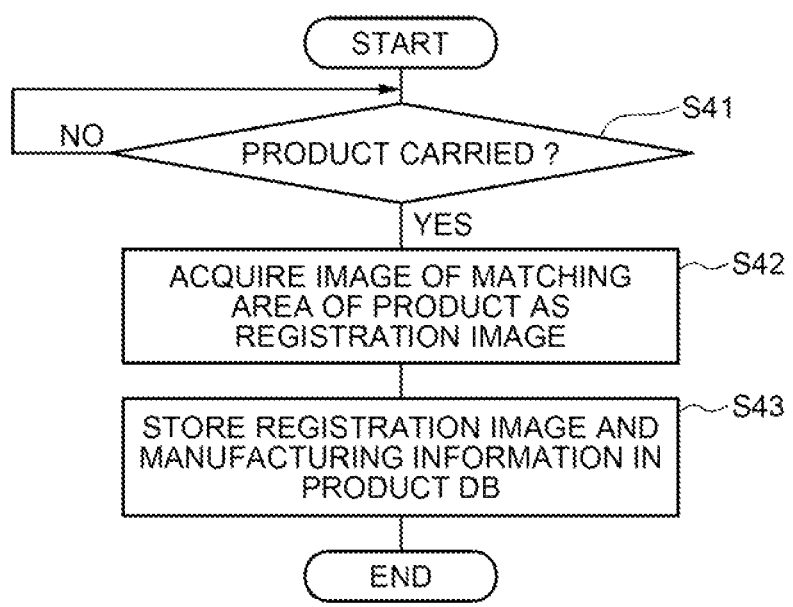
FIG. 11 is a flowchart illustrating an exemplary operation of a registration unit in an operation phase of the individual identification apparatus according to the first exemplary embodiment of the present invention.
Figure 12:
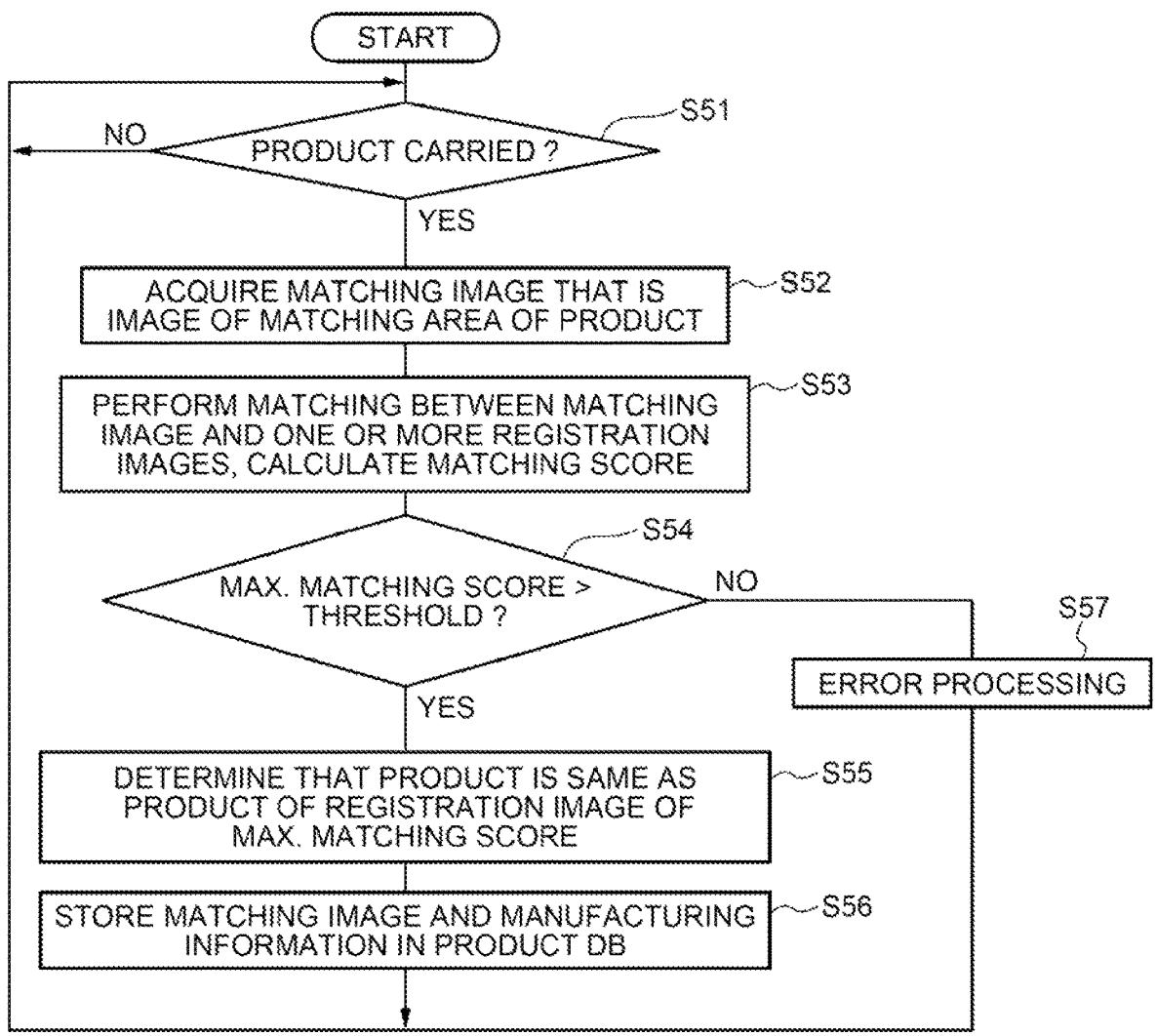
FIG. 12 is a flowchart illustrating an exemplary operation of a matching unit in the operation phase of the individual identification apparatus according to the first exemplary embodiment of the present invention.

Next, operation of the individual identification apparatus 100 in the operation phase will be described. FIG. 11 is a flowchart illustrating an exemplary operation of the registration unit 151 in the operation phase of the individual identification apparatus 100. Further, FIG. 12 is a flowchart illustrating an exemplary operation of the matching unit 152 of the individual identification apparatus 100 in the operation phase.

First, operation of the registration unit 151 in the operation phase of the individual identification apparatus 100 will be described with reference to FIG. 11. In the operation phase, when a product is carried into the first process processing device 201, it is detected by a sensor, not illustrated, provided to the first process processing device 201, and at the point of time when the tip of the product reaches the predetermined position X1, conveyance is temporarily stopped and the product is in a stationary state. Further, the fact that the product has been carried in the first process processing device 201 is notified from the first process processing device 201 to the individual identification apparatus 100 via communication. When the control unit 1514 of the registration unit 151 detects that the product has been carried via the communication (YES at step S41), the registration image acquisition unit 1512 acquires an image of the matching area of the product as the registration image (step S42). Then, the control unit 1514 stores the registration image and the manufacturing information of the product acquired from the first process processing device 201 in the product DB 143 of the storage unit 140 by the saving unit 1513 (step S43). The above-described operation is repeated each time a product is carried into the first process processing device 201.

Next, operation of the matching unit 152 in the operation phase will be described. When the product is carried into the second process processing device 202 by the conveying machine 204, it is detected by a sensor, not illustrated, provided to the second process processing device 202, and at the point of time when the tip of the product reaches the predetermined position X2, conveyance is temporarily stopped and the product is in a stationary state. Further, the fact that the product has been carried in the first process processing device 201 is notified from the second process processing device 202 to the individual identification apparatus 100 via communication. When the control unit 1525 of the matching unit 152 detects that the product has been carried (step S51), an image of the matching area of the product is acquired by the matching image acquisition unit 1522 as a matching image (step S52). Then, the control unit 1525 performs matching between the matching image and one or more registration images stored in the product DB 143 by the matching unit 1523, and calculates the matching score (step S53). Here, as one or more registration images on which matching with the matching image is performed, the matching unit 1523 uses a registration image in which matching with the matching image of the second process processing device has not succeeded, among the registration images registered with the product DB. For example, when the product DB 143 is in the state illustrated in FIG. 8 at the point of time of matching of the matching image, since matching between the registration image G101 and the matching image G201 has succeeded, matching is performed sequentially on the registration images G102 to G108 in which matching has not succeeded.

When there is a registration image whose matching score with the matching image is larger than the threshold (YES at step S54), the control unit 1525 determines that the product of the matching image is identical to the product of the registration image whose matching score is larger than the threshold (step S55). In that case, the control unit 1525 stores the matching image and the manufacturing information acquired from the second process processing device 202 in the product DB 143 in association with the matched registration image, by the saving unit 1524 (step S56). Then, the control unit 1525 returns to step S51 and repeats the same processing as that described above.

On the other hand, when there is no registration image whose matching score with the matching image is larger than the threshold in the product DB 143 (NO at step S54), the control unit 1525 performs error processing (step S57), and then returns to step S51 and repeats the same processing as that described above.

As described above, in the operation phase, the registration image of the product carried into the first process processing device and the matching image of the product carried into the second process processing device are acquired and applied with matching under the camera position adjusted in the adjustment phase, whereby identification of the individual product is performed.

As described above, according to the present embodiment, it is possible to positively allow the imaging condition of a matching image and the imaging condition of a registration image to coincide with each other. This is because the matching degree between a registration image obtained by imaging an object under a certain camera position and a matching image obtained by imaging the object under a certain camera position tends to be higher generally as the camera positions thereof are the same as much as possible.

Next, modifications of the present embodiment will be described.

In the embodiment described above, the positions of the cameras 211 and 212 are adjusted only in the upstream direction and the downstream direction of the flow of products (that is, left and right directions on the sheets of FIGS. 2 and 4). However, as another embodiment, the positions of the cameras 211 and 212 may be adjusted in the up and down direction on the sheets of FIGS. 2 and 4 (that is, a direction approaching the product and a direction away from the product), or in the vertical direction on the sheets of FIGS. 2 and 4. As described above, even in the case of adjusting the positions of the cameras 211 and 212 in the left and right direction on the sheets or vertical direction on the sheets of FIGS. 2 and 4, by adjusting the position of the camera 212 so as to be able to obtain a matching image whose matching score with a registration image of the reference product becomes equal to or larger than a threshold as similar to the above-described embodiment, it is possible to positively allow the imaging condition of the matching image and the imaging condition of the registration image to match.

Further, in the above-described embodiment, only the positions of the cameras 211 and 212 are adjusted. However, as another embodiment, the orientations and postures of the cameras 211 and 212 may be adjusted. As described above, even in the case of adjusting the orientations and postures of the cameras 211 and 212, by adjusting the orientation and the posture of the camera 212 so as to be able to obtain a matching image whose matching score with a registration image of the reference product becomes equal to or larger than a threshold as similar to the above-described embodiment, it is possible to positively allow the imaging condition of the matching image and the imaging condition of the registration image to coincide with each other.

Further, in the above-described embodiment, orientations and postures of the cameras 211 and 212 are adjusted. However, as another embodiment, lighting conditions such as illumination angles of lightings 231 and 232 may be adjusted. As described above, even in the case of adjusting the lighting conditions of the lightings 231 and 232, by adjusting the lighting condition of the lighting 232 so as to be able to obtain a matching image whose matching score with a registration image of a reference product becomes equal to or larger than a threshold as similar to the above-described embodiment, it is possible to positively allow the imaging condition of the matching image and the imaging condition of the registration image to coincide with each other.

Further, in the embodiment described above, in the adjustment phase other than the operation phase of the production system, with use of a reference product for position adjustment, the imaging condition of a matching image and the imaging condition of a registration image are positively caused to coincide with each other so as to obtain a matching image whose matching score with the registration image of the reference product becomes a threshold or larger. However, as another embodiment, in the operation phase of the production system, with use of a product actually produced, the imaging condition of a matching image and the imaging condition of a registration image may be positively caused to coincide with each other so as to obtain a matching image whose matching score with the registration image of the product becomes a threshold or larger. Hereinafter, an embodiment according to this modification will be described with reference to FIG. 13.

Figure 13:
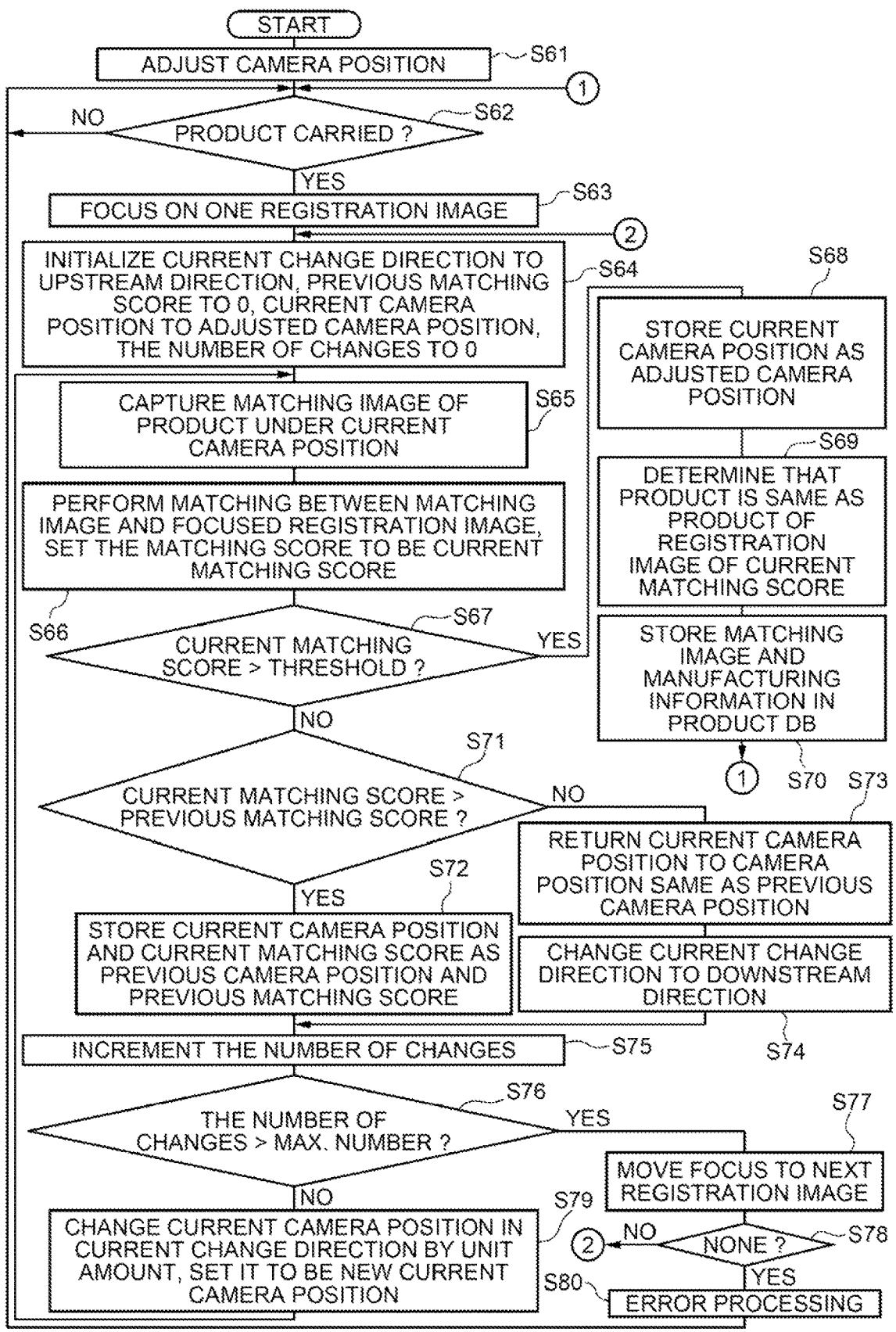
FIG. 13 is a flowchart illustrating an exemplary operation of a matching unit in the operation phase of the individual identification apparatus according to the first exemplary embodiment of the present invention.

Referring to FIG. 13, before initiating the operation phase, the control unit 1525 of the matching unit 152 adjusts the position of the camera 212 to the camera position that is the same as the camera 211 (step S61). That is, the operator inputs information of the camera position that is the same as the adjusted camera position of the camera 211 from the operation input unit 120, for example. The control unit 1525 of the matching unit 152 adjusts the position of the camera 212 of the second process processing device 202 by the imaging condition setting unit 1521, according to the input information of the camera position (step S21). Thereby, the position of the camera 212 is adjusted to a position almost coinciding with the matching area of the product to be processed by the second process processing device 202. However, due to an influence of an individual difference in the camera position adjusters, there is a possibility that position deviation may be caused between the matching area of the product imaged by the camera 212 of the second process processing device 202 and the matching area of the product imaged by the camera 211 of the first process processing device 201.

Then, when the product is carried into the second process processing device 202 by the conveying machine 204, it is detected by a sensor, not illustrated, provided to the second process processing device 202, and at the point of time when the tip of the product reaches the predetermined position X2, conveyance is temporarily stopped and the product is in a stationary state. Further, the fact that the product has been carried into the second process processing device 202 is notified from the second process processing device 202 to the individual identification apparatus 100 via communication. When the control unit 1525 of the matching unit 152 detects that the product is carried (step S62), the control unit 1525 focuses on one registration image in the product DB 143 (step S63). Then, the control unit 1525 initializes the current change direction to the upstream direction, the previous matching score to 0, and the current camera position to the camera position adjusted at step S61, respectively (step S64). Then, the control unit 1525 acquires a matching image that is an image of a matching area of the product having been carried, under the current camera position, by the matching image acquisition unit 1522 (step S65).

Then, the control unit 1525 performs matching between the matching image and the focused registration image by the matching unit 1523, and sets the calculated matching score to the current matching score (step S66). Then, the control unit 1525 determines whether or not the current matching score is larger than a preset threshold (step S67). Then, when the current matching score is larger than the threshold, the control unit 1525 stores the current camera position as an adjusted matching camera position (step S68), determines that the carried product is identical to the product of the registration image of the current matching score (step S69), and stores, by the saving unit 1524, the matching image and the manufacturing information in the product DB 143 in association with the focused registration image (step S70). Then, the control unit returns to the process of step S62.

On the other hand, when the current matching score is equal to or smaller than the threshold, the control unit 1525 determines whether or not the current matching score is larger than the previous matching score (step S71). Then, when the current matching score is larger than the previous matching score, the control unit 1525 stores the current camera position and the current matching score as the previous camera position and the previous matching score (step S72), and proceeds to step S75. Meanwhile, when the current matching score is not larger than the previous matching score, the control unit 1525 returns the current camera position to the camera position that is the same as the previous camera position (step S73), changes the current change direction to the downstream direction (step S74), and proceeds to step S75. Here, not only the case where the product of the matching image and the product of the focused registration image are identical to each other, even in the case where they are different, the position deviation amount of the matching area is smaller as the matching score between the registration image and the matching image is better. This is because in the matching area of the product, there are random patters unique to each individual product, and in the products manufactured using the same manufacturing mold or cutting tool, identical random patters due to the manufacturing mold and the like are formed in the manufacturing process. That is, taking a printed wiring board as an example, on a side surface of a printed wiring board before being carried into the first process processing device 201, random patters formed by the manufacturing mold are formed in addition to the random patters unique to the printed wiring board.

Referring to FIG. 13 again, at step S75, the control unit 1525 increments the number of changes. Then, the control unit 1525 determines whether or not the number of changes exceeds the maximum number of times set in advance (step S76), and when it does not exceed, sets a camera position obtained by changing the current camera position in the current change direction by the unit amount to be a new current camera position (step S79). Then, the control unit 1525 returns to step S65 and repeats the same processing as that described above. When the number of changes exceeds the maximum number of times, the control unit 1525 determines that the matching image does not match the focused registration image, and moves the focus to the next registration image (step S77). Then, the control unit 1525 returns to step S64 via step S78, and the processing that is the same as that described above is repeatedly performed on the newly focused registration image.

On the other hand, when all of the registration images on which matching should be performed in the product DB 143 have been focused (YES at step S78), the control unit 1525 determines that there is no registration image that matches the matching image, and performs error processing (step S80). Then, the control unit 1525 returns to step S62 and repeats the same processing as that described above.

As described above, in the modification illustrated in FIG. 13, in the operation phase of the production system, for each of the products actually produced, the imaging condition of a matching image and the imaging condition of a registration image can be positively caused to coincide with each other so as to obtain a matching image whose matching score with the registration image of the product becomes a threshold or larger.

Second Exemplary Embodiment

Figure 14:
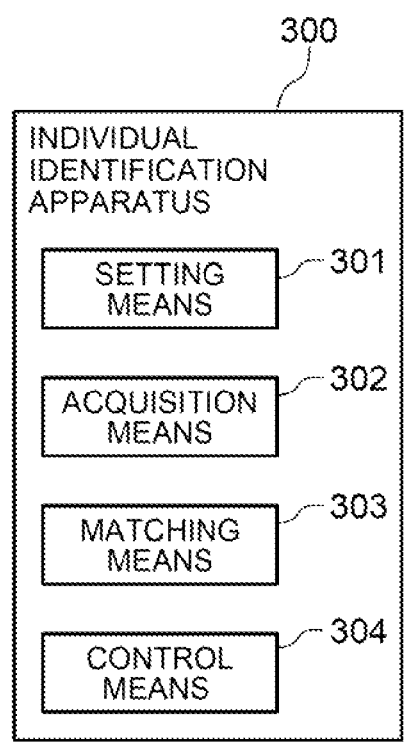
FIG. 14 is a block diagram of an individual identification apparatus according to a second exemplary embodiment of the present invention.

Next, a second exemplary embodiment of the present invention will be described with reference to FIG. 14. FIG. 14 is a block diagram of an individual identification apparatus 300 according to the present embodiment.

Referring to FIG. 14, the individual identification apparatus 300 includes a setting means 301, an acquisition means 302, a matching means 303, and a control means 304.

The setting means 301 is configured to set an imaging condition for imaging a matching area of an object by a camera. The setting means 301 may be configured similarly to the imaging condition setting unit 1521 of FIG. 7 for example, but is not limited thereto.

The acquisition means 302 is configured to acquire a matching image that is an image obtained by capturing the matching area of the object by the camera. The acquisition means 302 may be configured similarly to the matching image acquisition unit 122 of FIG. 7 for example, but is not limited thereto.

The matching means 303 is configured to perform matching between the matching image and a registration image that is an image of the matching area of the object registered in advance. The matching means 303 is also configured to identify an individual on the basis of the matching image captured under the imaging condition determined by the control means 304. The matching means 303 may be configured similarly to the matching unit 1523 of FIG. 7 for example, but is not limited thereto.

The control means 304 is configured to repeat the processing of acquiring the matching image by the acquisition means 302 while changing the imaging condition set by the setting means 301 and the processing of performing matching between the matching image and the registration image by the matching means 303, and determine the imaging condition in which the matching degree between the matching image and the registration image becomes equal to or larger than a preset threshold. The control means 304 may be configured similarly to the control unit 1525 of FIG. 7 for example, but is not limited thereto.

The individual identification apparatus 300 configured as described above operates as described below. The control means 304 repeats capturing, by the acquisition means 302, of a matching image that is an image of a matching area of an object and matching, by the matching means, between the matching image and a registration image that is an image of a matching area of an object registered in advance, while changing, by the setting means 301, the imaging condition for imaging the matching area of the object by a camera, and determines an imaging condition in which the matching degree between the matching image and the registration image becomes equal to or larger than a preset threshold. Then, the matching means 303 identifies an individual on the basis of the matching image captured under the determined imaging condition.

According to the individual identification apparatus 300 that is configured and operates as described above, it is possible to positively allow the imaging condition of a matching image and the imaging condition of a registration image to coincide with each other. This is because the matching degree between a registration image obtained by imaging an object under a certain imaging condition and a matching image obtained by imaging the object under a certain imaging condition generally tends to be higher as the imaging conditions thereof coincide with each other as much as possible.

While the present invention has been described with reference to the exemplary embodiments described above, the present invention is not limited to the above-described embodiments. The form and details of the present invention can be changed within the scope of the present invention in various manners that can be understood by those skilled in the art.

For example, while the present invention is applied to individual identification of products on a production line, the present invention is widely applicable to individual identification in a place other than a production line. For example, when imaging a matching area of a product by a camera of a smartphone in order to specify the manufacturing place of the marketed product, it is possible to determine the imaging condition in which the matching score with the reference image registered in advance in the smartphone is maximized, and to perform individual identification on the basis of the matching image captured under the determined imaging condition.

INDUSTRIAL APPLICABILITY

The present invention is applicable to the field of identifying individuals. For example, the present invention is applicable to the field of identifying individuals of products flowing on a production line.

The whole or part of the exemplary embodiments disclosed above can be described as, but not limited to, the following supplementary notes.

(Supplementary Note 1)
An individual identification apparatus comprising:
setting means for setting an imaging condition for imaging a matching area of an object by a camera;
acquisition means for acquiring a matching image that is an image obtained by imaging the matching area of the object by the camera;
matching means for performing matching between the matching image and a registration image registered in advance; and
control means for repeating processing of acquiring the matching image by the acquisition means and processing of performing matching between the matching image and the registration image by the matching means while changing the imaging condition set by the setting means, and determining an imaging condition in which a matching degree between the matching image and the registration image becomes equal to or larger than a preset threshold, wherein
the matching means identifies an individual on a basis of the matching image captured under the determined imaging condition.

(Supplementary Note 2)
The individual identification apparatus according to supplementary note 1, wherein
the registration image is an image in which a matching area of an object identical to the object of the matching image is captured.

(Supplementary Note 3)
The individual identification apparatus according to supplementary note 2, wherein
the registration image is an image in which a matching area of an object manufactured on a production line that is same as a production line of the object of the matching image is captured.

(Supplementary Note 4)
The individual identification apparatus according to any of supplementary notes 1 to 3, wherein
the control means compares a matching degree between the matching image after the imaging condition is changed in a certain direction by a certain value and the registration image, with a matching degree between the matching image before the imaging condition is changed and the registration image, and determines whether or not to further change the imaging condition in the certain direction.

(Supplementary Note 5)
The individual identification apparatus according to any of supplementary notes 1 to 4, wherein
the control means repeats the processing of acquiring the matching image by the acquisition means and the processing of performing matching between the matching image and the registration image by the matching means while changing the imaging condition set by the setting means with use of a product for position adjustment, and determines an imaging condition in which a matching degree between the matching image and the registration image becomes equal to or larger than a preset threshold, and for another product other than the product for position adjustment, the matching means identifies an individual on a basis of the matching image captured under the determined imaging condition.

(Supplementary Note 6)
An individual identification method comprising:
repeating capturing of a matching image that is an image of a matching area of an object and matching between the matching image and a registration image that is an image of a matching area of an object registered in advance, while changing an imaging condition for imaging the matching area of the object by a camera;
determining an imaging condition in which a matching degree between the matching image and the registration image becomes equal to or larger than a preset threshold; and identifying an individual on a basis of the matching image captured under the determined imaging condition.

(Supplementary Note 7)

A program for causing a computer to perform processing of:

repeating capturing of a matching image that is an image of a matching area of an object and matching between the matching image and a registration image that is an image of a matching area of an object registered in advance, while changing an imaging condition for imaging the matching area of the object by a camera;

determining an imaging condition in which a matching degree between the matching image and the registration image becomes equal to or larger than a preset threshold; and identifying an individual on a basis of the matching image captured under the determined imaging condition.

REFERENCE SIGNS LIST 10 individual identification system
100 individual identification apparatus
110 communication I/F unit
120 operation input unit
130 screen display unit
140 storage unit
141 program
142 reference image
143 product DB
150 arithmetic processing unit
151 registration unit
152 matching unit
201 first process processing device
202 second process processing device
203-205 conveying machine
211, 212 camera
221, 222 camera position adjuster
231, 232 lighting
241, 242 product
1511 imaging condition setting unit
1512 registration image acquisition unit
1513 saving unit
1514 control unit
1521 imaging condition setting unit
1522 matching image acquisition unit
1523 matching unit
1524 saving unit
1525 control unit

What is claimed is:

1. An individual product identification apparatus having an adjustment phase and an operation phase following the adjustment phase, an imaging condition being adjusted in the adjustment phase, an individual product being identified in the operation phase, the individual product identification apparatus comprising:

a memory storing program instructions; and
a processor coupled to the memory and configured to execute the program instructions to:

in the adjustment phase:
acquire a registration image obtained by capturing a portion of a reference product by a first camera;
set the imaging condition for imaging the portion of the reference product by a second camera;
acquire a matching image obtained by imaging the portion of the reference product by the second camera under the set imaging condition;
compare the acquired matching image and the registration image to determine a matching degree therebetween;

repeat:
change the imaging condition in a direction by a value;
reacquire the matching image obtained by imaging the portion of the reference product by the second camera under the imaging condition as has been changed;
compare the reacquired matching image and the registration image to redetermine the matching degree therebetween; and
compare the matching degree as was redetermined after the imaging condition was changed in the direction by the value with the matching degree as was determined or redetermined before the imaging condition was changed, to determine whether or not to further change the imaging condition in the direction,
until it has been determined that the imaging condition is not to be further changed in the direction, in order to determine the imaging condition to be used in the operation phrase;

in the operation phase,
acquire, for each of a plurality of products, a registration image obtained by capturing a portion of the product by the first camera;
store the acquired registration image for each product in a database;
acquire a matching image obtained by capturing a portion of one of the plurality of products, by the second camera under the imaging condition to be used in the operation phase as has been determined in the adjustment phase;
compare the matching image acquired in the operation phase to the registration image for each product stored in the database to determine a matching degree therebetween; and
determine that the one of the plurality of products of the matching image acquired in the operation phase is identical to the product of the registration image for which the matching degree is greater than a preset threshold.

2. The individual product identification apparatus according to claim 1, wherein
the first and second cameras are located on an upstream side and a downstream side of a production line, respectively.

3. An individual product identification method performed by an individual product identification apparatus having an adjustment phase and an operation phase following the adjustment phase, an imaging condition being adjusted in the adjustment phase, an individual product being identified in the operation phase, the individual product identification method comprising:

in the adjustment phase:
acquiring a registration image obtained by capturing a portion of a reference product by a first camera;
setting the imaging condition for imaging the portion of the reference product by a second camera;
acquiring a matching image obtained by imaging the portion of the reference product by the second camera under the set imaging condition;
comparing the acquired matching image and the registration image to determine a matching degree therebetween;
repeating:
changing the imaging condition in a direction by a value;

reacquiring the matching image obtained by imaging the portion of the reference product by the second camera under the imaging condition as has been changed;
comparing the reacquired matching image and the registration image to redetermine the matching degree therebetween; and
comparing the matching degree as was redetermined after the imaging condition was changed in the direction by the value with the matching degree as was determined or redetermined before the imaging condition was changed, to determine whether or not to further change the imaging condition in the direction,
until it has been determined that the imaging condition is not to be further changed in the direction, in order to determine the imaging condition to be used in the operation phrase;
in the operation phase,
acquiring, for each of a plurality of products, a registration image obtained by capturing a portion of the product by the first camera;
storing the acquired registration image for each product in a database;
acquiring a matching image obtained by capturing a portion of one of the plurality of products, by the second camera under the imaging condition to be used in the operation phase as has been determined in the adjustment phase;
comparing the matching image acquired in the operation phase to the registration image for each product stored in the database to determine a matching degree therebetween; and
determining that the one of the plurality of products of the matching image acquired in the operation phase is identical to the product of the registration image for which the matching degree is greater than a preset threshold.

4. A non-transitory computer-readable storage medium storing instructions executable by an individual product identification apparatus to perform processing, the individual product identification apparatus having an adjustment phase and an operation phase following the adjustment phase, an imaging condition being adjusted in the adjustment phase, an individual product being identified in the operation phase, the processing comprising:
in the adjustment phase:
acquiring a registration image obtained by capturing a portion of a reference product by a first camera;
setting the imaging condition for imaging the portion of the reference product by a second camera;
acquiring a matching image obtained by imaging the portion of the reference product by the second camera under the set imaging condition;
comparing the acquired matching image and the registration image to determine a matching degree therebetween;
repeating:
changing the imaging condition in a direction by a value;
reacquiring the matching image obtained by imaging the portion of the reference product by the second camera under the imaging condition as has been changed;
comparing the reacquired matching image and the registration image to redetermine the matching degree therebetween; and
comparing the matching degree as was redetermined after the imaging condition was changed in the direction by the value with the matching degree as was determined or redetermined before the imaging condition was changed, to determine whether or not to further change the imaging condition in the direction,
until it has been determined that the imaging condition is not to be further changed in the direction, in order to determine the imaging condition to be used in the operation phrase;
in the operation phase,
acquiring, for each of a plurality of products, a registration image obtained by capturing a portion of the product by the first camera;
storing the acquired registration image for each product in a database;
acquiring a matching image obtained by capturing a portion of one of the plurality of products, by the second camera under the imaging condition to be used in the operation phase as has been determined in the adjustment phase;
comparing the matching image acquired in the operation phase to the registration image for each product stored in the database to determine a matching degree therebetween; and
determining that the one of the plurality of products of the matching image acquired in the operation phase is identical to the product of the registration image for which the matching degree is greater than a preset threshold.

5. The individual product identification apparatus according to claim 1, wherein the imaging condition is a position of the second camera.

6. The individual product identification apparatus according to claim 1, wherein changing the imaging condition includes adjusting a position of the second camera in a direction parallel to a flowing direction of a production line.

7. The individual product identification apparatus according to claim 1, wherein changing the imaging condition includes adjusting a position of the second camera in a direction perpendicular to a flowing direction of a production line.

* * * * *